United States Patent [19]

Kvasnicka

[11] 4,368,815

[45] Jan. 18, 1983

[54] BILLET TURNING MECHANISM

[75] Inventor: Frank Kvasnicka, Pittsburgh, Pa.

[73] Assignee: White Consolidated Industries, Inc., Cleveland, Ohio

[21] Appl. No.: 191,310

[22] Filed: Sep. 26, 1980

[51] Int. Cl.³ .......................................... B65G 47/24
[52] U.S. Cl. .................................. 198/413; 414/774; 414/779; 414/783
[58] Field of Search ............... 414/754, 759, 763, 771, 414/774, 775, 779, 783; 198/375, 379, 413

[56] References Cited

U.S. PATENT DOCUMENTS

| 2,892,366 | 6/1959 | Moore | 198/413 X |
|---|---|---|---|
| 3,044,636 | 7/1962 | Smith | 414/783 |
| 3,112,829 | 12/1963 | Modder | 414/771 |
| 3,167,978 | 2/1965 | Wistreich et al. | |
| 3,184,077 | 5/1965 | Clark et al. | 414/754 |
| 3,400,835 | 9/1968 | Rhoads | 414/774 |
| 3,401,805 | 9/1968 | Buchheit | 414/783 |
| 3,487,953 | 1/1970 | Wolf | 414/759 |
| 3,795,322 | 3/1974 | Buchheit | 414/779 |
| 3,866,762 | 2/1975 | Paletzki | 414/783 |
| 4,032,019 | 6/1977 | Noll et al. | 414/759 X |

FOREIGN PATENT DOCUMENTS

| 18178 | of 1888 | United Kingdom | 414/771 |
|---|---|---|---|
| 951740 | 3/1964 | United Kingdom | 414/771 |

Primary Examiner—Leslie J. Paperner
Attorney, Agent, or Firm—Buell, Blenko, Ziesenheim & Beck

[57] ABSTRACT

Apparatus for turning an elongated billet on a mill table about its longitudinal axis without displacing it laterally of the table comprises a U-shaped billet rotating head mounted on a car movable below the mill table transversely thereof. Means are provided for simultaneously rotating the billet-turning head and moving the car in the direction opposite to the direction of rotation of the billet rotating head.

14 Claims, 13 Drawing Figures

BILLET TURNING MECHANISM

This invention relates to apparatus for turning or rotating billets about their longitudinal axes on mill tables or the like. It is more particularly concerned with such apparatus which turns the billets in place, that is, without displacing them laterally of the table.

BACKGROUND OF THE INVENTION

Billets of steel and other metals are elongated articles of square or occasionally diamond-shaped cross section. For various reasons it is often desirable to turn or rotate such billets about their longitudinal axes, usually by 90° after they are deposited hot on a mill table or similar conveyor and travel therealong. Turning a billet 90° about one edge, of course, displaces it transversely of the table by the thickness of the billet, so that it must be slid back by that amount if it is to remain in the same line of travel as before. It is desirable that the billet turning apparatus be constructed so that it does no obstruct or encumber the mill or conveyor table when it is not in use.

My invention has as its principal object to provide an apparatus for turning or rotating a billet about its longitudinal axis without displacing it transversely. It is another object of my invention to provide such apparatus which turns billets traveling along the table without interrupting their travel. It is still another object to provide such apparatus that leaves the table completely clear when the turning apparatus is not in use. It is yet another object of my invention to provide such apparatus in which the angle of rotation of the billet is adjustable. Other objects of my invention will appear in the course of the description thereof which follows.

SUMMARY OF THE INVENTION

My invention comprises a billet-turning head pivotally mounted on a car which travels beneath the mill table on a track transverse thereof. When the apparatus is not in use the billet-turning head is withdrawn below the table surface. In use the head rises, engages opposite sides of a billet between freely rotatable rollers and rotates about a longitudinal axis, thus rotating the billet. Simultaneously the car is moved in the direction opposite the direction of rotation of the billet-turning head, so that the billet after rotation remains on the table in place, that is, without transverse displacement.

BRIEF DESCRIPTION OF DRAWINGS

An embodiment of my invention presently preferred by me is illustrated in the attached drawings in which:

FIG. 4 is a broken away view of a portion of my apparatus as shown in FIG. 2a.

My apparatus is mounted on a pair of parallel I-beams 12 disposed transversely of the mill table and below it. The top of the table rollers is indicated by the broken line in FIGS. 2b, 3, and 7. The inside lower flanges of beams 12 form a track for car 13 having four wheels 11. Car 13 carries a first pair of upstanding brackets 14 on its upper surface near one end, which brackets journal a transverse shaft 15. On that shaft is mounted a platform 16 extending away from shaft 15 toward the center of car 13. From the shaft end of platform 15 a pair of arms 17 extends in the opposite direction, forming a clevis in which a depending arm 19 is journaled on a shaft 18. Arm 19 is connected to a vertical hydraulic cylinder 20 disposed below it which cylinder is pivotally mounted in car 13 below shaft 18.

Platform 16 at its end opposite shaft 15 is bifurcated and its legs 21 journal a transverse shaft 22. On shaft 22 between legs 21 is pivotally mounted a cross member 23 which, in its position shown in FIG. 2b, has a vertical end face 24 facing away from shaft 18. On face 24 is mounted a freely rotatable billet gripping roller 25 with its axis normal to end face 24. A pair of cranks 26 affixed to cross member 23 extends away from cross member 23 and from roller 25 and at their opposite end journal a hydraulic cylinder 27. Intermediate the ends of cranks 26 are affixed transverse stub shafts 28, each extending outwardly from its crank 26.

Figure 1A:
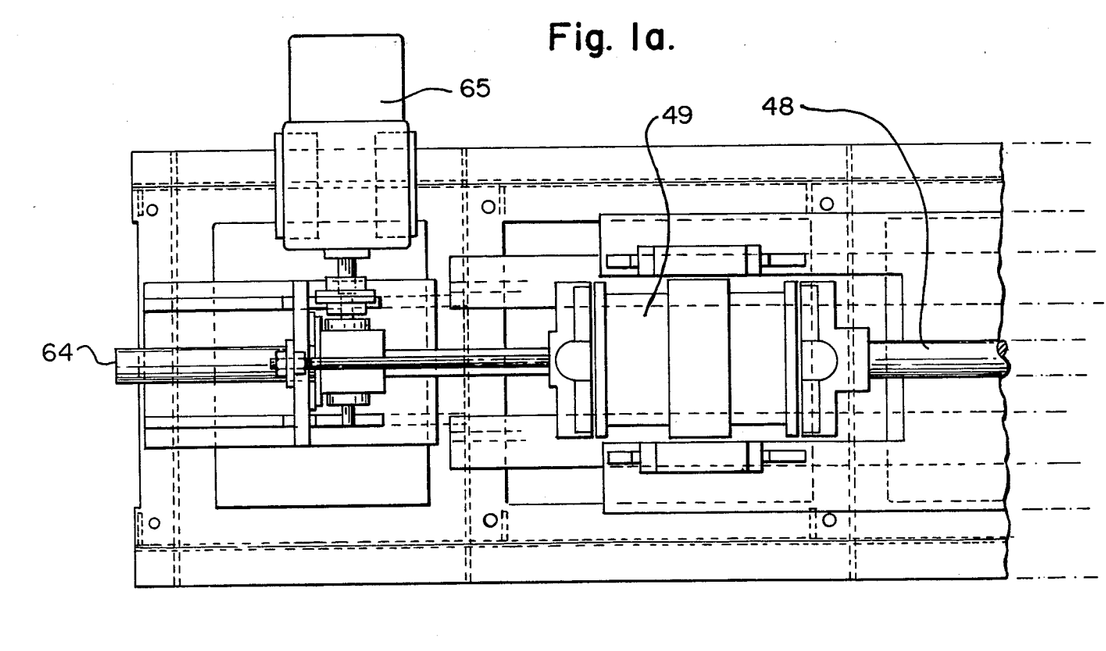
FIGS. 1a and 1b are a plan of my apparatus showing the billet-turning head rotated 90° from its home or initial position.
Figure 1B:
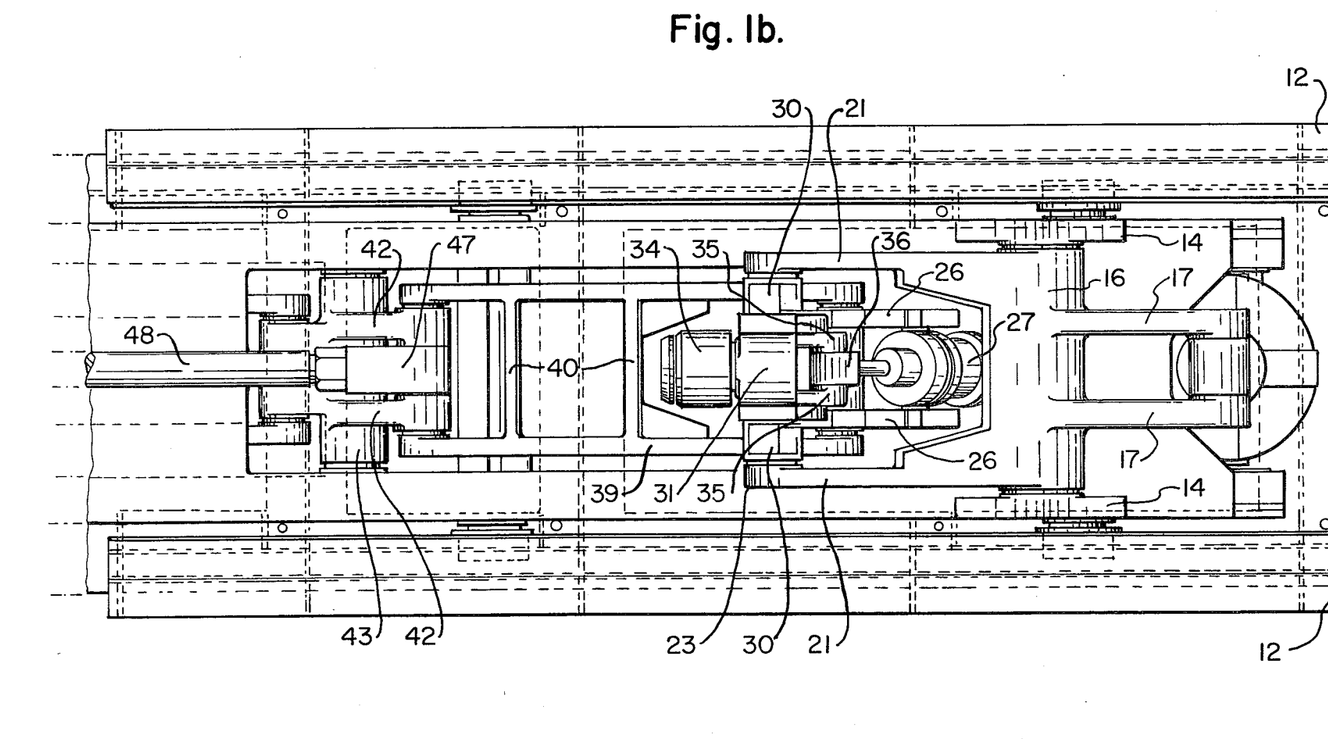
Figure 2A:
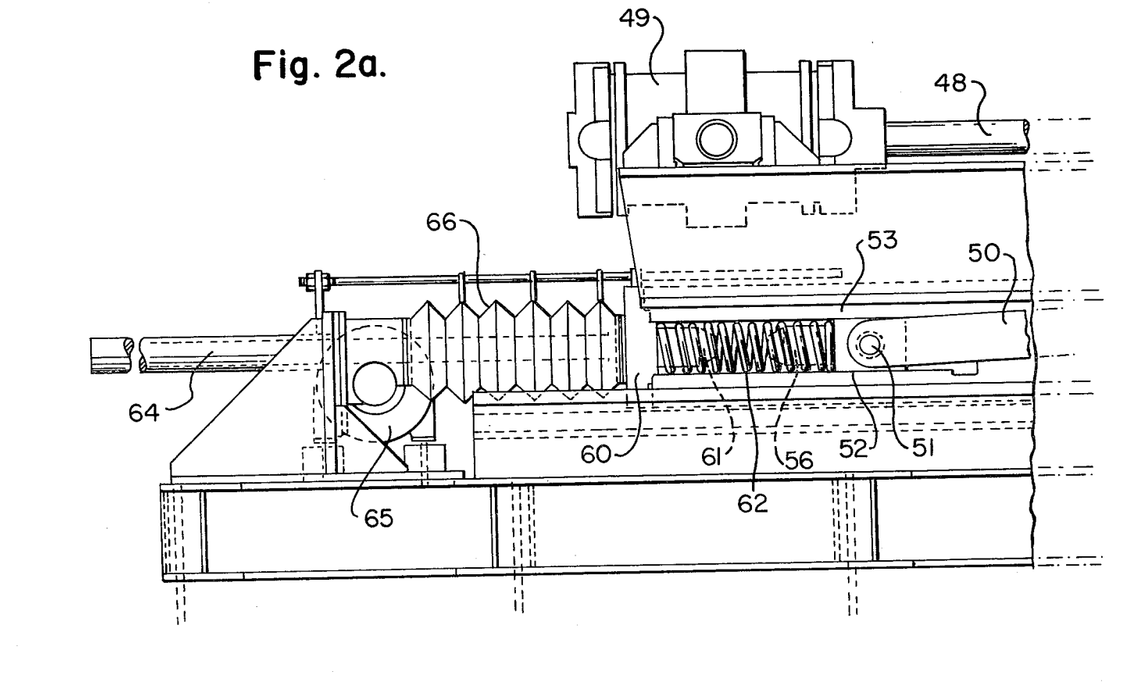
FIGS. 2a and 2b are a side elevation, partly broken away, of the apparatus of FIG. 1.
Figure 2B:
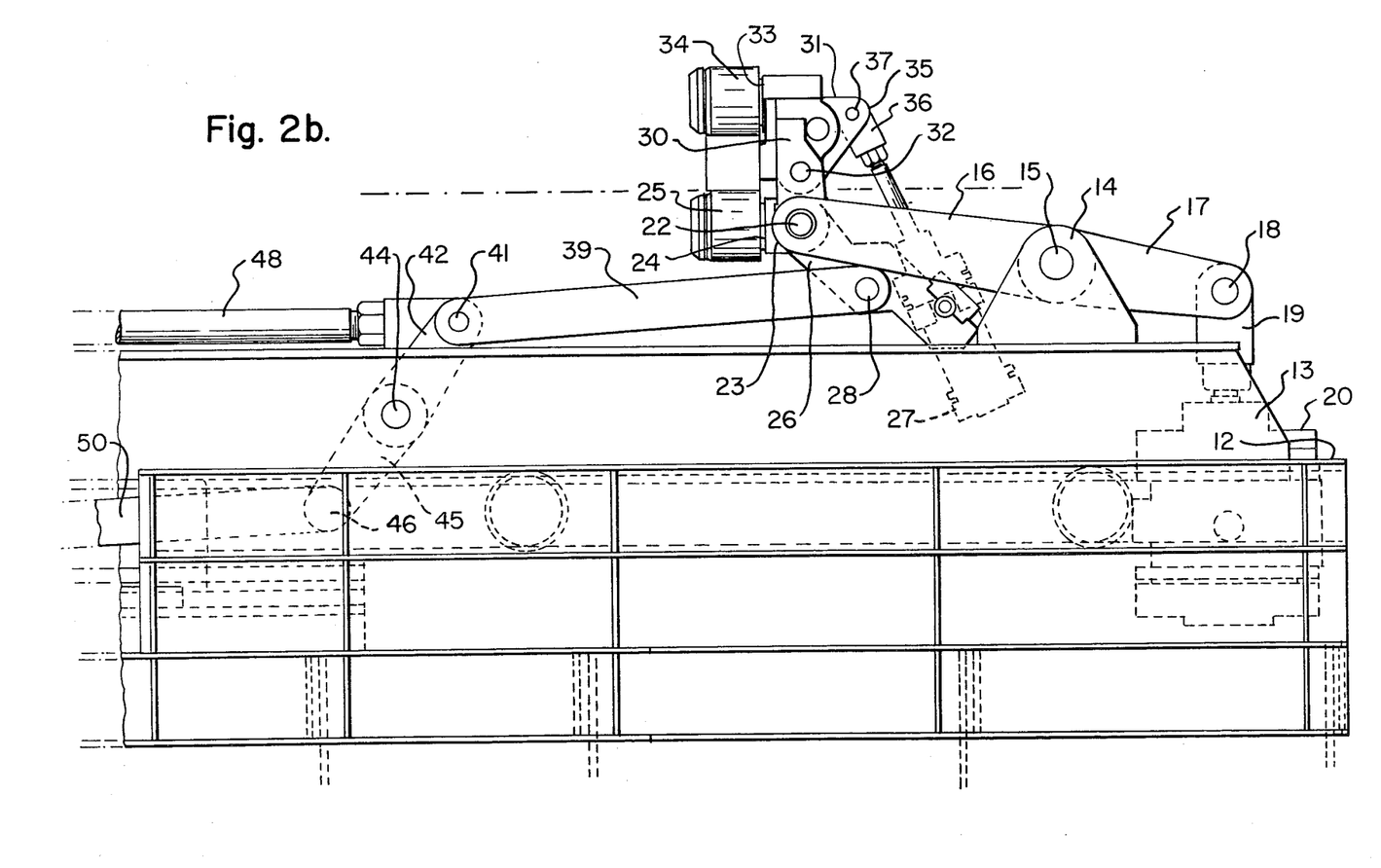
Figure 3:
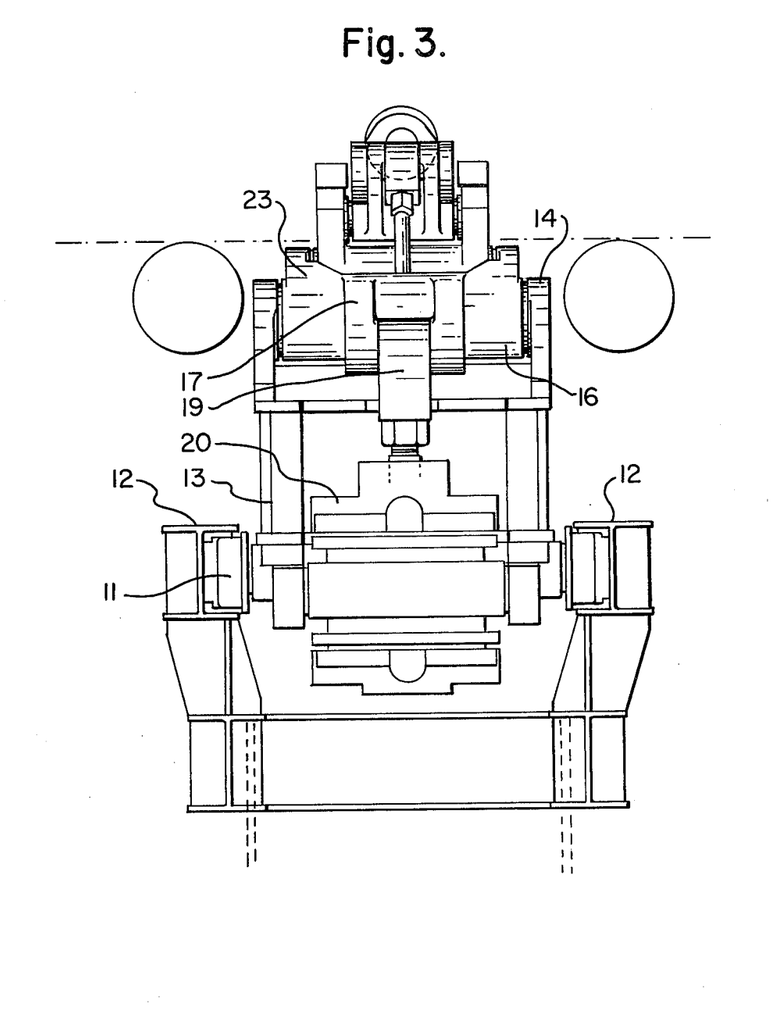
FIG. 3 is an end elevation of the apparatus of FIGS. 1b and 2b.

A pair of arms 30 extends upwardly from cross member 23 in FIG. 2b at 90° from roller 25, forming a clevis for member 31 which is pivotally mounted in that clevis on cross shaft 32. Member 31, in the position shown in FIG. 2b, also has a vertical end face 33 and on that face is mounted a second freely rotatable billet gripping roller 34. From the face of member 31 opposite face 33 extends a pair of lugs 35 forming a clevis for arm 36 which is pivotally journaled therein on shaft 37. Arm 36 is connected to hydraulic cylinder 27.

Stub shafts 28 previously mentioned serve as pivots for one end of arms 39 which extend away from shaft 28 towards the end of car 13 opposite the end holding hydraulic cylinder 20. Cross pieces 40 form an open frame with arms 39. The other ends of those arms are pivotally connected, one on each end, with a cross shaft 41. Between those ends and also pivoted on shaft 41 are spaced legs 42 which project from a cross member 43 pivotally mounted on a shaft 44, the ends of which are journaled in car 13. A single leg 45 projects from cross member 43 in the direction opposite to that of legs 42. Between legs 42 and also provided on shaft 41 is the end 47 of thrust member 48 which extends parallel to car 13 to hydraulic cylinder 49 which is pivotally mounted at the other end of car 13.

Figure 4:
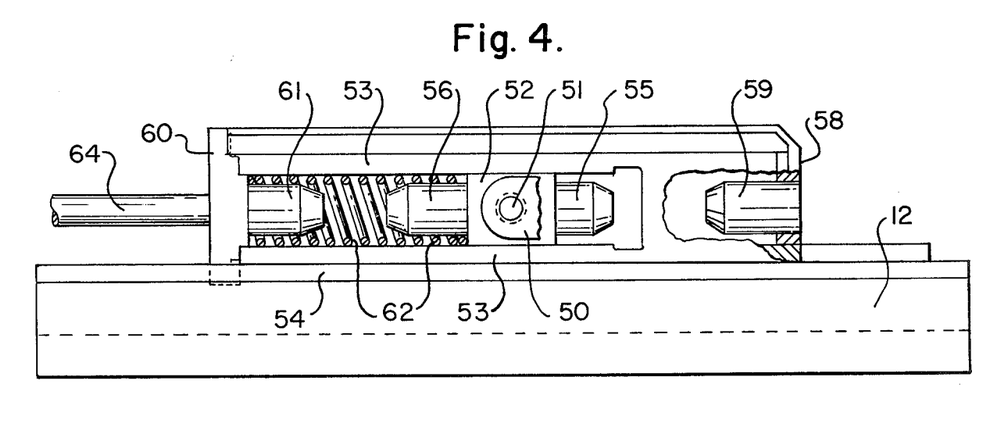

The projecting end of leg 45 previously mentioned is pivotally connected at 46 to a bifurcated end of an elongated member 50 which is disposed between I-beams 12. The other end of member 50 also bifurcated, is pivotally connected to shaft 51 of cross member 52 which slides parallel to I-beams 12 in ways 53 which in turn are slidably mounted on ways 54 supported on foundation I-beams 12. The end of cross member 52 nearer the billet turning head carries a projecting circular plug 55, as is seen in FIG. 4. The other end of cross member 52 carries a like plug 56 projecting in the opposite direction. Ways 53 are closed at their ends nearer the billet turning head by an end cap 58 which carries a plug 59 similar to plug 55 and facing it. The other end of ways 53 is closed by an end cap 60 carrying on its inside face a plug 61 like plugs 55, 56 and 59 previously mentioned. A coil spring 62 is fitted over plugs 56 and 61 so as to urge cross member 52 away from end cap 60. A threaded shaft 64 connected to end cap 60 extends away from the outer end thereof and can be moved axially by a rotating nut, not shown, which is caused to rotate by motor 65. Shaft 64 is protected by an extensible boot 66.

Figure 5:
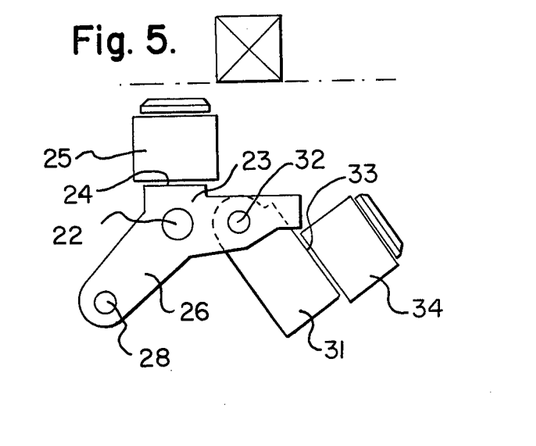
FIGS. 5 thru 10 are diagrammatic representations of various positions of the billet-turning head of my apparatus.
Figure 6:
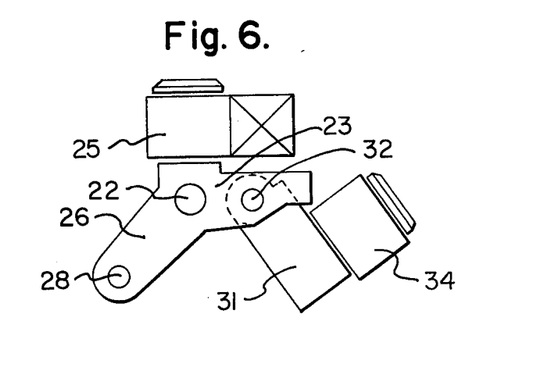

The operation of my apparatus will be described as it is used to rotate a square billet 90°. My apparatus is mounted between rollers of a mill or conveyor table, indicated in FIG. 3, and in its normal position the entire apparatus is below the tops of the table rollers. The billet turning head in its stand-by or home position is shown in FIG. 5. Billet engaging roller 25 is vertical. Roller 34 is rotated away from parallelism with roller 25 by the operation of hydraulic cylinder 27 which pulls member 31 outwardly and downwardly around shaft 32. The billet-turning head is raised to engage a billet above it on the roller table by actuating hydraulic cylinder 20 so as to retract its piston rod (FIG. 6). As roller 34 is spaced away from roller 25 it is not necessary to have the billet-turning head exactly aligned with the billet.

Figure 7:
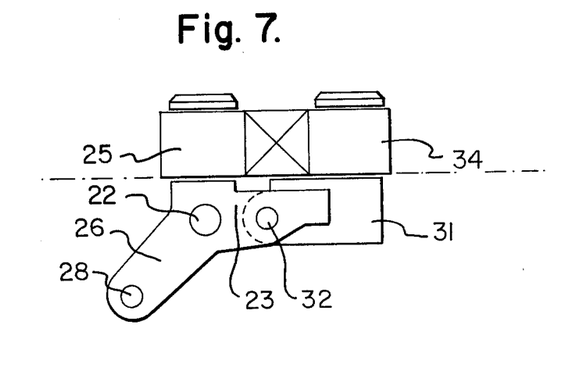
Figure 8:
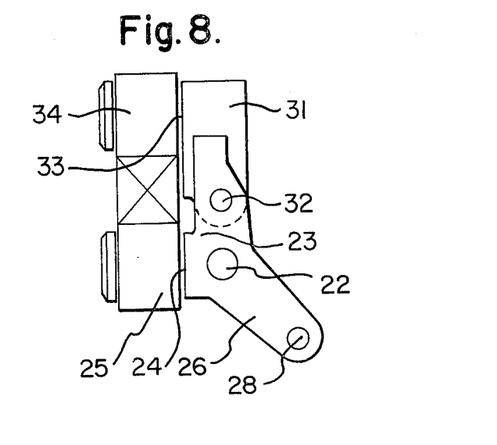

Hydraulic cylinder 27 is then operated to bring roller 34 parallel with roller 25 as is shown in FIGS. 6 and 7, the billet-rotating head thus grasping the billet on its opposite sides. As both rollers 25 and 34 are freely rotatable, the billet may be engaged while it is traveling along the mill table without interrupting its travel. Hydraulic cylinder 49 is then operated to extend its piston rod, pushing cross member 43 and arms 39 attached thereto away from it and causing cranks 26 to pivot counterclockwise about their cross shaft 22, as is shown in FIG. 2b. This movement brings the billet rotating head into the position shown in FIG. 8. Legs 42, however, have their upper ends pivotally connected to the outside ends of arms 39 and lower ends pivotally connected to a stationary element 50 but are pivotally mounted on car 13 on pivot shaft 44; thus the thrust of cylinder 49 causes car 13 to move transversely of the roller table on its rails 12 away from motor 65, that is to say, in the direction opposite to the direction of rotation of the billet-turning head. The lengths of the various lever arms are so related that the movement of car 13 and the translational movement of the billet-turning head are equal, and as they are opposite in direction, the billet is turned 90° about its long axis without translational or lateral movement on the roll table.

Figure 9:
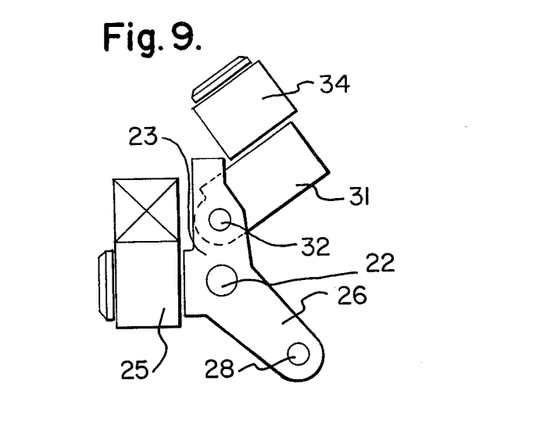
Figure 10:
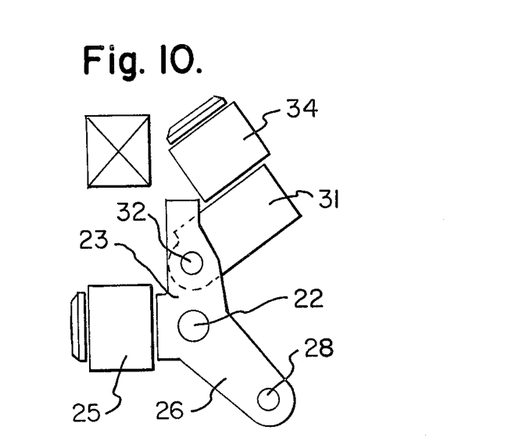

Cylinder 27 is then actuated to tilt billet engaging roll 34 upwardly and away from its companion roll 25 to the position shown in FIG. 9. Hydraulic cylinder 20 is then operated to lower the billet-turning head into the position shown in FIG. 10. Finally, hydraulic cylinder 49 is caused to retract its piston rod, thus returning the billet-turning head and car 13 on which it is mounted to their original positions.

Pivot 46 previously mentioned is stationary during the billet-turning operation. The angle through which the billet-turning head of my apparatus is rotated may be adjusted by moving pivot point 46 parallel to foundation I-beams 12. This adjustment is effected by motor 65 and shaft 64 previously mentioned. It will be evident that the weight of a billet rotated by the billet-turning head may be considerable. As the head is turned from the position of FIG. 7 to that of FIG. 8, the billet passes thru a balance point where it is directly above shaft 22 to an overbalanced position, and that shift may cause crank 26 to be jerked or moved suddenly counterclockwise as shown in FIG. 2a, creating a shock which is transmitted from it through the linkage above described to pivot 46 in the direction away from the billet-turning head. The apparatus for adjusting the pivot point 46, best shown in FIG. 4, cushions that shock as will be described.

Cross member 52 is urged away from end cap 60 by coil spring 62 as has been mentioned. Shock transmitted to pivot 46 above-mentioned is transmitted directly to cross member 52 through member 50. Spring 62 thus cushions that shock so that is not transmitted to end cap 60 and shaft 64. To move pivot 46 toward the billet-turning head, shaft 64 is caused to move in that direction by motor 65. Shaft 64 pushes the entire assembly of ways 53, end cap 60 and plug 61 in that direction and that movement first compresses spring 62 and then moves cross member 52 in the desired direction. To move pivot 46 in the opposite direction shaft 64 is moved in the reverse direction, causing the assembly of ways 53 and their associated end caps to move with it. Plug 59 carried by end cap 58 is thus brought into contact with plug 55 carried by cross member 52, moving it in the desired direction.

Figure 11:
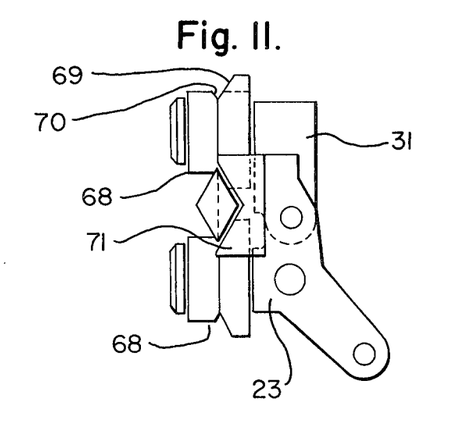
FIG. 11 illustrates a modified billet-turning head suitable for turning diamond-shaped billets.

FIG. 11 shows a modification of my apparatus in which the rotating billet-turning head is adapted for turning a diamond shape billet. It is common practice in rolling square billets to square billets of a smaller size to roll the billet first to a diamond shape with unequal axes. This shape is rolled with the long axis of the diamond horizontal. Then the billet is turned 90° about its axis and rolled down to a square of smaller size.

For turning diamond shape billets, billet engaging rollers 25 and 34 previously described are replaced by identical rollers 68 shown in FIG. 11. Each roller has a portion adjacent the member on which it is mounted with a frusto-conical surface 69 on its opposite face. The remainder of the roller is cylindrical of a smaller diameter than the maximum diameter of frusto-conical surface 69 but with a beveled edge 70 abutting surface 69 to form a V-groove therewith having an angle equal to the acute angle of the diamond shape billet. Backup plates 71 are affixed on each side of member 23, each plate having a V-shaped outer profile of an angle equal to the obtuse angle of the diamond shape billet but with clearance therefrom. Plates 71 assist in holding the billet upright in the position shown in FIG. 11 while the billet is passing longitudinally through rollers 68. The rotating head so modified cannot be returned to its position of FIG. 5 until the billet has cleared it.

In the following claims the billet turning head is characterized as "upright" when it is in the position shown in FIGS. 5, 6 and 7. It is characterized as "sideways" when it is in position shown in FIGS. 8, 9, 10 and 11. The term "stationary" means attached at some point to the I-beams 12, the foundation of those I-beams, or the ground, but does not exclude adjustable means. The term "link" comprehends any rigid member.

I claim:
1. Apparatus for turning a billet in place on a mill table about its longitudinal axis comprising a car mounted for movement below the mill table transversely thereof, a U-shaped billet-turning head mounted on the car normal thereto for rotation about an axis crosswise of the car at the bottom of the U, and single means connected with the billet-turning head and with the car for rotating the billet-turning head with respect to the car from an upright position to a sideways position and simultaneously moving the car in the direction opposite the direction of rotation of the billet-turning head, whereby the billet is rotated without being translated laterally with respect to the mill table.

2. Apparatus of claim 1 in which the means connected with the car are mounted on the car.

3. Apparatus of claim 2 in which the means mounted on the car are connected to stationary means.

4. Apparatus of claim 3 in which the position of the stationary means is adjustable lengthwise of the car.

5. Apparatus of claim 3 in which the axis of rotation of the U-shaped billet-turning head is positioned at the bottom of a first leg of the U and in which the second leg is pivoted to the bottom of the U to open away therefrom.

6. Apparatus of claim 5 including means carried by the billet-turning head for rotating the second leg of the U about its pivot.

7. Apparatus of claim 3 in which the billet-engaging ends of the billet-turning head are freely rotatable rolls.

8. Apparatus of claim 3 including means carried by the car for raising and lowering the billet-turning head thereon so that the billet-turning head in its upright position is raised into billet-engaging position.

9. Apparatus of claim 8 in which the means for raising and lowering the billet-turning head comprise a link pivotally mounted on the car intermediate the ends of the link, means mounted on the car and connected to one end of the link for raising and lowering that end, and pivoted connecting means between the other end of the link and the billet-turning head.

10. Apparatus of claim 3 in which the means for rotating the billet-turning head and simultaneously moving the car in the direction opposite the direction of rotation of the billet-turning head comprise a first link pivoted intermediate its length on the car for movement in a vertical plane parallel to the car, means pivotally connecting the stationary means to one end of the first link, a yoke slidably mounted on the car pivotally connected to the other end of the first link, an arm affixed to the billet-turning head at the bottom of one leg of the U, a second link pivotally connected at one end to that arm and pivotally connected at the other end to the yoke, and means carried by the car for imparting translational movement to the yoke.

11. Apparatus of claim 10 in which the stationary means are connected to the end of the first link thru means of adjustable length.

12. Apparatus of claim 11 in which the means of adjustable length comprise stationary ways extending parallel to the car, a cross member slidably mounted in the ways, pivoted means connecting the cross member and the said one end of the first link, and stationary means connected with the cross member for adjusting the position of the cross member longitudinally on the stationary ways.

13. Apparatus of claim 12 including movable ways closed at each end extending parallel to the car and slidably mounted on the stationary ways and in which the cross member is slidably mounted in the movable ways and the stationary means for adjusting the position of the cross member are connected to a closed end of the movable ways.

14. Apparatus of claim 13 including resilient compressible means interposed between the cross member and at least one closed end of the movable ways.

* * * * *

UNITED STATES PATENT AND TRADEMARK OFFICE
CERTIFICATE OF CORRECTION

PATENT NO. : 4,368,815

DATED : January 18, 1983

INVENTOR(S) : FRANK KVASNICKA

It is certified that error appears in the above-identified patent and that said Letters Patent are hereby corrected as shown below:

Column 1, line 21, "no" should be --not--.

Column 2, line 47, "provided" should be --pivoted--.

Signed and Sealed this

Twelfth Day of April 1983

[SEAL]

Attest:

GERALD J. MOSSINGHOFF

Attesting Officer          Commissioner of Patents and Trademarks